(12) United States Patent
Yamazaki

(10) Patent No.: US 8,000,046 B2
(45) Date of Patent: Aug. 16, 2011

(54) STORAGE DEVICE, PROCESSOR OR STORAGE DEVICE, AND COMPUTER PROGRAM PRODUCT FOR PROVIDING PARAMETER ADJUSTMENT DURING READ/WRITE OPERATIONS

(75) Inventor: Yuichiro Yamazaki, Kanagawa (JP)

(73) Assignee: Toshiba Storage Device Corporation, Tokyo (JP)

(*) Notice: Subject to any disclaimer, the term of this patent is extended or adjusted under 35 U.S.C. 154(b) by 0 days.

(21) Appl. No.: 12/631,697

(22) Filed: Dec. 4, 2009

(65) Prior Publication Data
US 2010/0103561 A1   Apr. 29, 2010

Related U.S. Application Data

(63) Continuation of application No. PCT/JP2007/061262, filed on Jun. 4, 2007.

(51) Int. Cl.
G11B 27/36 (2006.01)
(52) U.S. Cl. .......................... 360/31; 360/294
(58) Field of Classification Search .......... None
See application file for complete search history.

(56) References Cited

U.S. PATENT DOCUMENTS
5,831,781 A * 11/1998 Okamura ............ 360/31
2006/0126204 A1* 6/2006 Taniguchi et al. ........ 360/31

FOREIGN PATENT DOCUMENTS
| JP | H05-142317 A | 6/1993 |
| JP | 09-180373 | 7/1997 |
| JP | H10-091908 A | 4/1998 |
| JP | 2000-235703 | 8/2000 |
| JP | 2003-223701 | 8/2003 |
| JP | 2006-309810 | 11/2006 |

OTHER PUBLICATIONS
International Search Report mailed Jul. 17, 2007 by the Japan Patent Office.
Explanation of Non-English Language References, Dec. 4, 2009.

* cited by examiner

Primary Examiner — Jason C Olson
(74) Attorney, Agent, or Firm — Knobbe Martens Olson & Bear, LLP

(57) ABSTRACT

According to one embodiment, a storage device includes: ahead actuator configured to move a head to an arbitrary position on a disk medium; a write/read module configured to write data to or read data from the disk medium using the head; an adjustment region selector configured to divide the disk medium into a plurality of regions in a circumferential direction, write test data to each of the regions, read the test data to measure signal quality of the each of the regions, compare the signal quality of the each of the regions, and select a parameter adjustment region; and a parameter adjustment module configured to adjust a parameter used for the write/read module to write data to and read data from the disk medium to an optimal value using the selected parameter adjustment region.

20 Claims, 14 Drawing Sheets

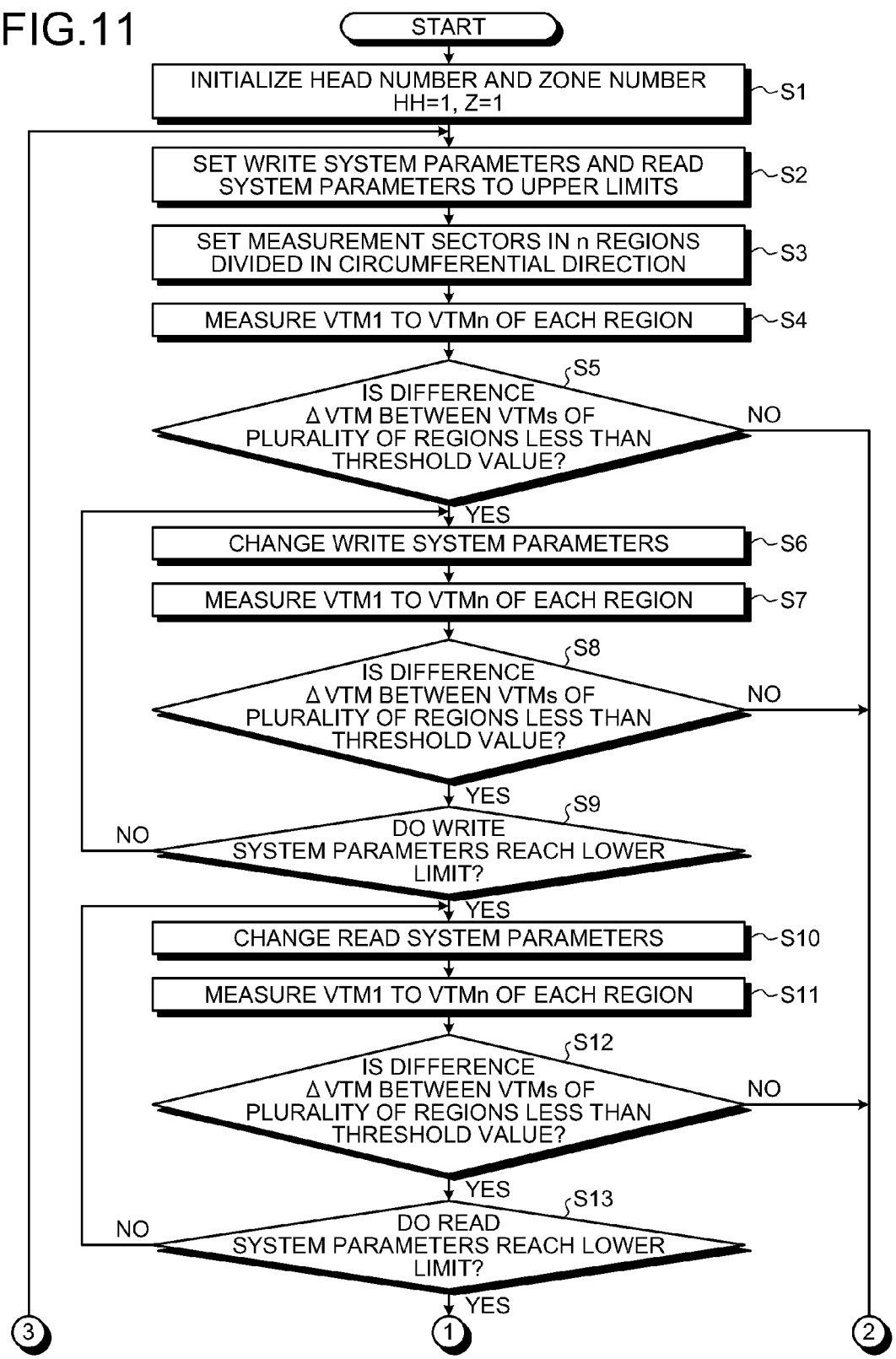

| ADJUSTMENT REGION | WRITE PARAMETERS | | READ PARAMETERS | |
|---|---|---|---|---|
| | WRITE CURRENT Iw | OVERSHOOT | CUT-OFF FREQUENCY | BOOT VALUE |
| 98-1 | Iwa | O/Sa | fca | Ba |
| 98-2 | Iwb | O/Sb | fcb | Bb |
| 98-3 | Iwc | O/Sc | fcc | Bc |
| 98-4 | Iwd | O/Sd | fcd | Bd |

| OPTIMAL PARAMETER VALUE ADJUSTMENT REGION | VTM MEASUREMENT REGION | | | |
|---|---|---|---|---|
| | 98-1 | 98-2 | 98-3 | 98-4 |
| 98-1 | VTMaa | VTMab | VTMac | VTMad |
| 98-2 | VTMba | VTMbb | VTMbc | VTMbd |
| 98-3 | VTMca | VTMcb | VTMcc | VTMcd |
| 98-4 | VTMda | VTMdb | VTMdc | VTMdd |

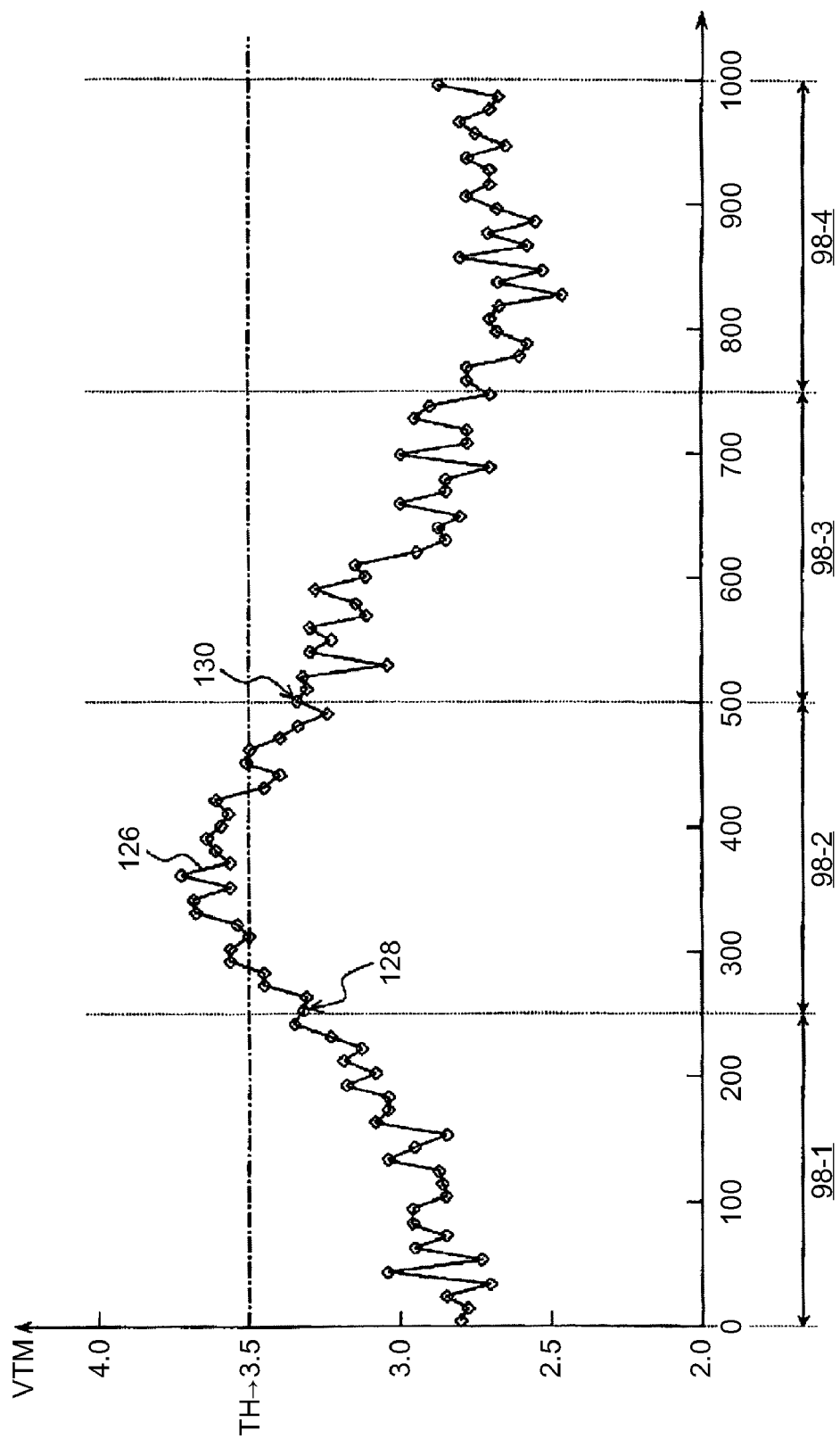

STORAGE DEVICE, PROCESSOR OR STORAGE DEVICE, AND COMPUTER PROGRAM PRODUCT FOR PROVIDING PARAMETER ADJUSTMENT DURING READ/WRITE OPERATIONS

CROSS-REFERENCE TO RELATED APPLICATIONS

This application is a continuation of PCT international application Ser. No. PCT/JP2007/61262 filed on Jun. 4, 2007 which designates the United States, incorporated herein by reference.

BACKGROUND

1. Field

One embodiment of the invention relates to a storage device, a processor of a storage device, and a computer program product capable of optimizing a parameter set when data is written to or read from a magnetic disk medium, and more particularly, to a storage device, a processor of a storage device, and a computer program product capable of optimizing a parameter while writing data to a magnetic disk medium and subsequently reading data from the magnetic disk medium.

2. Description of the Related Art

In conventional magnetic disk devices, when data is written to a magnetic disk, a hard disk controller converts write data received from a host device into a predetermined data format, and performs error-correcting code (ECC) encoding process to add an ECC code to the write data. Then, a write modulation system of a read channel performs scramble process, run-length limited (RLL) code conversion process, and write compensation process. Then, a write amplifier amplifies the data, and a write element of the head selected by a head integrated circuit (IC) writes the data to the magnetic disk.

When data is read from the magnetic disk, a read element of the head selected by a head selection signal from the head IC reads a signal, and a pre-amplifier amplifies the read signal. Then, the amplified signal is input to a read demodulation system of a read channel, and the read demodulation system demodulates the read data using, for example, partial response maximum likelihood (PRML) detection. Then, the demodulated data is subjected to RLL decoding process and descramble process. Thereafter, the hard disk controller performs ECC demodulation process on the data to correct an error, and the read data is transmitted to the host device.

A write system parameter and read system parameter corresponding to the characteristics of the head or the magnetic disk are necessitated for the write/read operation. Therefore, in test process after the magnetic disk device is manufactured, the write system parameter and the read system parameter are adjusted to optimal values that correspond to the characteristics of the head and the magnetic disk.

Process of adjusting the write system parameter and the read system parameter is performed for each of heads and each of zones that are divided in the radius direction of the magnetic disk. That is, a head and a zone of the magnetic disk to be adjusted are selected, and the parameters are adjusted while writing data to and reading data from a sector, which is an adjustment position, of a predetermined track in the selected zone such that the best signal quality (margin) is obtained (for example, see Japanese Patent Application (KO-KAI) No. H5-142317 and Japanese Patent Application (KO-KAI) No. H10-91908).

However, in the conventional parameter adjustment process, the adjustment position is fixed to a position of a sector of a predetermined track in a selected zone of a magnetic disk corresponding to a selected head, and thereafter, the data is written to the adjustment position, and the data is subsequently read from the sector, to optimize the parameters. Therefore, it is sometime difficult to optimize the parameters of certain magnetic disks. Accordingly, in the worst case, when the write/read operation is performed after the parameters are adjusted, defect error in medium that cannot be recovered occurs. In addition, the write and read performances deteriorate due to alternating process.

Even when the parameters are optimized, the error occurs due to the quality of the magnetic disk in the manufacturing process. In general, there exists non-uniformity in the magnetic disk in the manufacturing process, so that there is an attempt to uniformize the medium. However, there is a limitation in uniformizing the medium. In addition, when the recording density of the magnetic disk increases, the non-uniformity becomes apparent in the magnetic disk.

The non-uniformity of the magnetic disk occurred through the manufacturing process causes the unevenness of the in-plane coercivity in the magnetic disk medium.

Conventionally, when there is the variation in the in-plane coercivity in the magnetic disk, the data writing, the data reading, and the adjustment of the parameters such that the best signal quality is obtained, are performed at a particular position. In other words, conventionally, the parameters are not adjusted by taking into account the variation in coercivity.

Therefore, when there is a large variation in the in-plane coercivity in the magnetic disk and the parameters are adjusted using a sector with low in-plane coercivity as an adjustment position, the write performance becomes insufficient at a position where the in-plane coercivity is high. Accordingly, in the worst case, an unrecovered error occurs due to the medium defect.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 11 is an exemplary flowchart illustrating parameter adjustment process in the one embodiment;

FIG. 16 is an exemplary diagram illustrating another example of the distribution of VTMs corresponding to one track which are measured by the parameters before adjustment in the another embodiment.

DETAILED DESCRIPTION

Various embodiments according to the invention will be described hereinafter with reference to the accompanying drawings. In general, according to one embodiment of the invention, a storage device includes: a head actuator configured to move a head to an arbitrary position on a disk medium; a write/read module configured to write data to or read data to or from the disk medium using the head; an adjustment region selector configured to divide the disk medium into a plurality of regions in a circumferential direction, write test data to each of the regions, read the test data to measure the signal quality of the each of the regions, compare the signal quality of the each of the regions, and select a parameter adjustment region; and a parameter adjustment module configured to adjust a parameters used for the write/read module to write data to and read data to or from the disk medium to an optimal values using the selected parameter adjustment region.

According to another embodiment of the invention, a processor of a storage device instructs a head actuator to move a head to an arbitrary position on a disk medium, instructs the head to write data to or read data from the disk medium, divides the disk medium into a plurality of regions in a circumferential direction, writes test data to each of the regions, reads the test data to measure the signal quality of the each of the regions, compares the signal quality of the each of the regions to select a parameter adjustment region, and adjusts a parameter used to write data to and read data from the disk medium in the read/write process to an optimal value using the selected parameter adjustment region.

According to still another embodiment of the invention, a computer program product having a computer readable medium including programmed instructions that, when executed by a computer, cause the computer to perform: allowing a head actuator to move a head to an arbitrary position on a disk medium; allowing the head to write data to or read data from the disk medium; dividing the disk medium into a plurality of regions in a circumferential direction, writing test data to each of the regions, reading the test data to measure the signal quality of the each of the regions, comparing the signal quality of the each of the regions, and selecting a parameter adjustment region; and adjusting a parameter used to write data to and read data from the disk medium to an optimal value using the selected parameter adjustment region.

Figure 1:
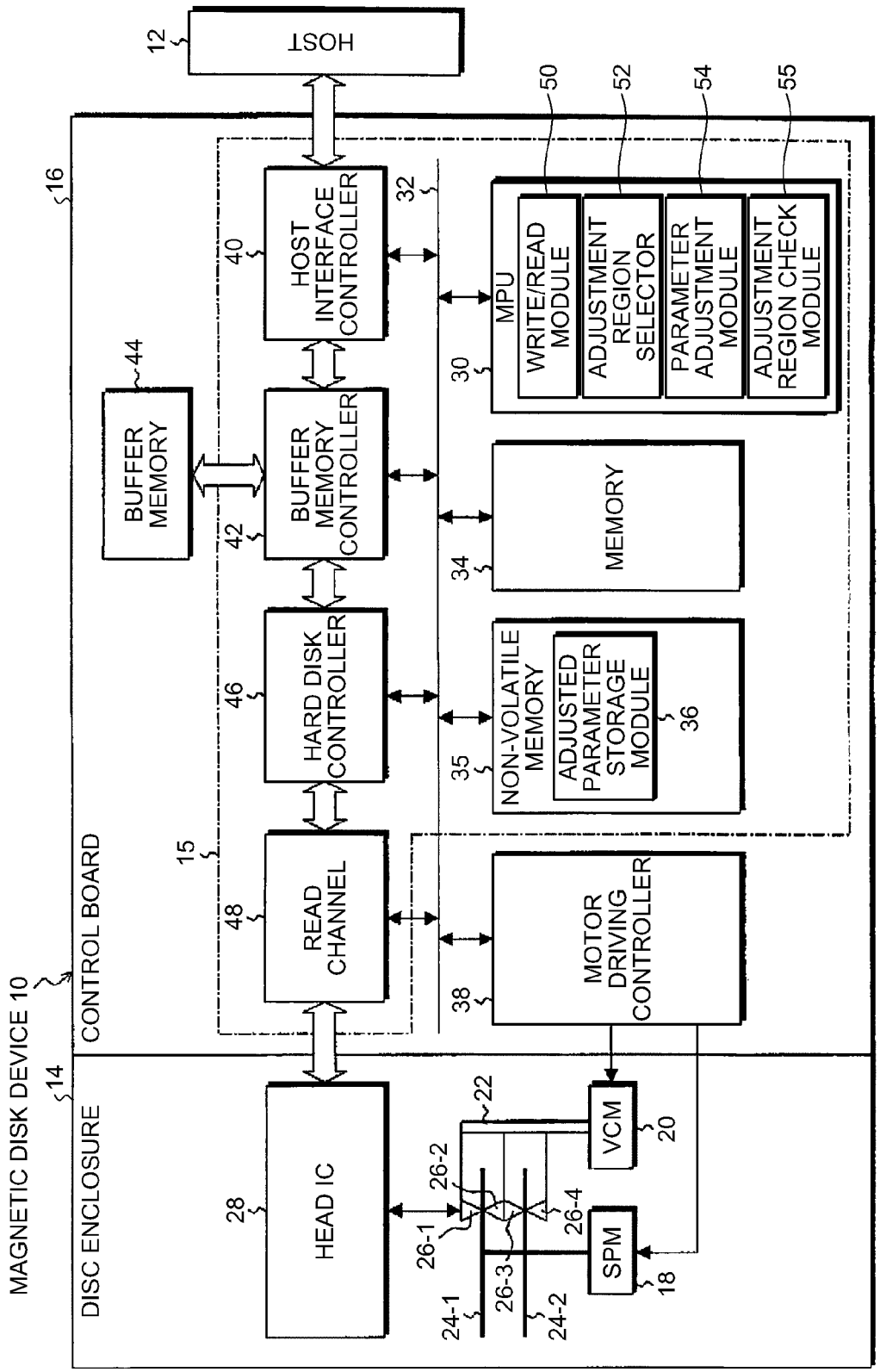
FIG. 1 is an exemplary block diagram illustrating a magnetic disk device to which parameter adjustment process is applied according to one embodiment of the invention.

FIG. 1 is a block diagram illustrating a magnetic disk device to which a parameter adjustment process according to one embodiment of the invention is applied. In FIG. 1, a magnetic disk device 10 which is known as a hard disk drive (HDD) comprises a disk enclosure 14 and a control board 16.

The disk enclosure 14 is provided with a spindle motor (SPM) 18. Magnetic disks (disk media) 24-1 and 24-2 are attached to a rotating shaft of the SPM 18 and are rotated at a constant speed of, for example, 4200 round per minute (rpm).

In addition, the disk enclosure 14 is provided with a voice coil motor (VCM) 20. The VCM 20 drives a head actuator 22 that supports heads 26-1 to 26-4 at the leading end of an arm and moves the heads 26-1 to 26-4 to arbitrary positions on the recording surfaces of the magnetic disks 24-1 and 24-2.

The heads 26-1 to 26-4 are hybrid heads in which a recording element and a reproducing element are integrated with each other. A longitudinal magnetic recording element or a vertical magnetic recording element is used as the recording element. When the vertical magnetic recording element is used, vertical recording media, each having a recording layer and a soft magnetic underlying layer, are used as the magnetic disks 24-1 and 24-2. A giant magnetoresistance (GMR) element or a tunnel magnetoresistance (TMR) element is used as the read element.

The heads 26-1 to 26-4 are connected to a head integrated circuit (IC) 28 through individual signal lines. The head IC 28 selects one of the heads in response to a head selection signal, and performs a write or read operation in response to a write command or a read command from a host 12, which is a host device. The head IC 28 comprises a write drive that is provided for a write system and a pre-amplifier that is provided for a read system.

The control board 16 is provided with a micro processing unit (MPU) 30 serving as a processor, a memory 34, which is a RAM, and a non-volatile memory 35 which is, for example, a flash memory (FROM) and stores a control program (firmware) or control data. The memory 34 and the non-volatile memory 35 are connected to the MPU 30 through a bus 32.

In addition, a host interface controller 40, a buffer memory controller 42 that controls a buffer memory 44, a hard disk controller (HDC) 46 serving as a formatter, a read channel 48 serving as a write modulator and a read modulator, and a motor driving controller 38 that controls the SPM 18 and the VCM 20, are connected to the MPU 30 through the bus 32.

The MPU 30, the memory 34, the host interface controller 40, the buffer memory controller 42, the hard disk controller 46, and the read channel 48 provided in the control board 16 form a control circuit 15. The control circuit 15 is configured as one large-scale integration (LSI) circuit.

Figure 2:
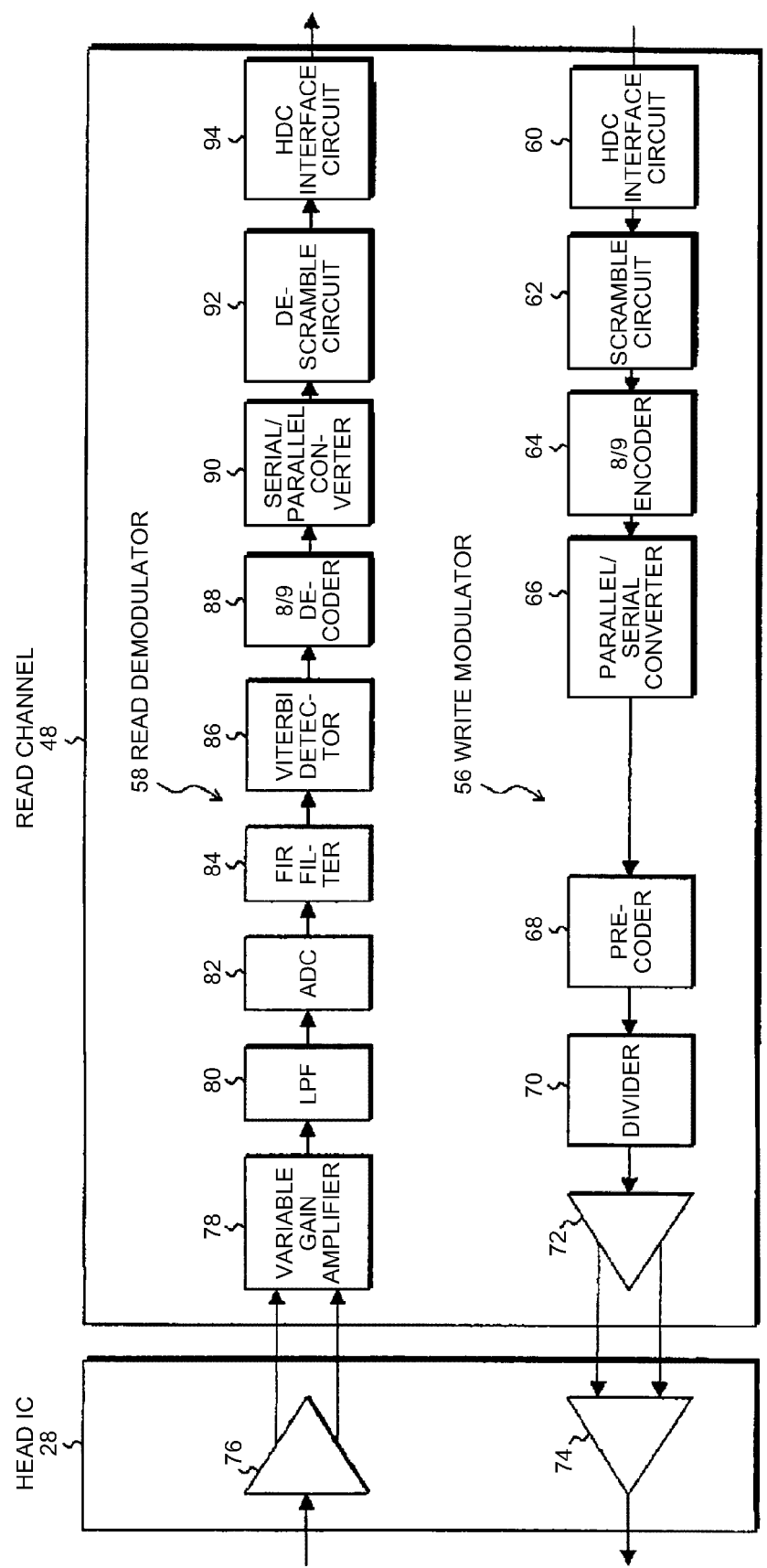
FIG. 2 is an exemplary block diagram illustrating details of a read channel illustrated in FIG. 1 in the one embodiment.

FIG. 2 is a block diagram illustrating the detailed structures of the read channel 48 and the head IC 28 illustrated in FIG. 1. In FIG. 2, the read channel 48 is provided with a write modulator 56 and a read demodulator 58. The write modulator 56 comprises an HDC interface circuit 60, a scramble circuit 62, an 8/9 encoder 64 for run length encoding, a parallel/serial converter 66, a pre-coder 68, a divider 70, and a driver 72.

The write modulator 56 receives write data formatted by the formatter provided in the HDC 46 illustrated in FIG. 1 from the HDC interface circuit 60. The scramble circuit 62 performs XOR operation on the received write data and a predetermined pseudo random series to scramble the write data. The 8/9 encoder 64 converts the write data into an 8/9 code. The parallel/serial converter 66 converts the 8/9 code into serial data.

The pre-coder 68 performs $1/(1+D)^n$ pre-coding such that the read demodulator 58 can detect a partial response Viterbi, and then performs write compensation. The divider 70 performs a division operation, and the driver 72 supplies a write current to the recording element of a selected head through a driver 74 of the head IC 28. In this way, data is written to the magnetic disk.

The read demodulator 58 of the read channel 48 comprises a variable gain amplifier 78, a low pass filter (LPF) 80, an analog to digital converter (ADC) 82, a finite impulse response (FIR) filter 84, a Viterbi detector 86, an 8/9 decoder 88, a serial/parallel converter 90, a descramble circuit 92, and an HDC interface circuit 94.

In the read demodulator 58, the variable gain amplifier 78 amplifiers a head read signal received from a pre-amplifier 76 of the head IC 28 by automatic gain control. The read signal amplified by the variable gain amplifier 78 passes through the LPF 80 and is then sampled into digital data by the ADC 82 Then, an automatic equalization type Viterbi detector including the FIR filter 84 and the Viterbi detector 86 performs partial response Viterbi detection such as PR4LM or EPR4LM.

In the partial response Viterbi detection, an automatic equalizer using the FIR filter 84 is provided before the Viterbi detector 86. The FIR filter 84, which is the automatic equalizer, has an automatic equalization function for automatically adjusting a tap coefficient on the basis of a trimming signal written to a sector format of the magnetic disk.

The data detected by the Viterbi detector 86 is demodulated into the original write data by the 8/9 decoder 88. The data demodulated by the 8/9 decoder 88 is converted into parallel data by the serial/parallel converter 90, and the descramble circuit 92 performs XOR operation on the parallel data and the pseudo random series of the scramble circuit 62 provided in the write modulator 56 to descramble the parallel data. The descrambled data is output from the HDC interface circuit 94 to the HDC 46 illustrated in FIG. 1.

Referring to FIG. 1 again, the MPU 30 is provided with a write/read module 50 that is implemented by executing the control program stored in the non-volatile memory 35 as firmware. The non-volatile memory 35 is provided with an adjusted parameter storage module 36 that stores the optimal values obtained by adjusting a write system parameter and a read system parameter that are used during the write and read operation of the write/read module 50.

In the embodiment, the MPU 30 is provided with the functions of an adjustment region selector 52 and a parameter adjustment module 54. The adjustment region selector 52 and the parameter adjustment module 54 are implemented by allowing the MPU 30 to execute parameter adjustment firmware that is downloaded from a test apparatus in a test process after the magnetic disk device 10 is assembled in a manufacturing line.

The parameter adjustment firmware installed from the test apparatus to the non-volatile memory 35 is executed to implement the functions of the adjustment region selector 52 and the parameter adjustment module 54. Accordingly, the parameter adjustment firmware calculates the optimal values of the write system parameters and the read system parameters, and stores the calculated values in the adjusted parameter storage module 36.

After the optimal values of the parameters are calculated as mentioned above, the functions of the adjustment region selector 52 and the parameter adjustment module 54 become no longer necessary. Hence, the parameter adjustment firmware is removed from the non-volatile memory 35.

Alternatively, after the magnetic disk device 10 is forwarded to the user with the parameter adjustment firmware remaining in the non-volatile memory 35, the parameter adjustment firmware may be executed to readjust the parameters.

When the head actuator 22 is driven to move the heads 26-1 to 26-4 to arbitrary positions on the magnetic disks 24-1 and 24-2, the write/read module 50 provided in the MPU 30 controls the head selected by a head selection signal from the head IC 28, such as the head 26-1, to write data to or read data from a medium write surface of the magnetic disk 24-1.

The adjustment region selector 52 divides the medium recording surface of each of the magnetic disks 24-1 and 24-2 into a plurality of regions in the circumferential direction, writes the test data to and reads the test data from each of the regions, and measures a signal quality corresponding to distribution of in-plane coercivity Hc in the magnetic disk. Here, the signal quality is, for example, a Viterbi trellis margin (VTM) obtained from the read channel 48. Then, the adjustment region selector 52 compares the VTMs obtained as the signal quality of the regions with each other, and selects a parameter adjustment region to which the test data is to be written or to which the test data is to be read from, in order to adjust the parameters.

After the write/read module 50 writes the test data to and reads the written test data from the parameter adjustment region selected by the adjustment region selector 52 in the magnetic disk, the parameter adjustment module 54 adjusts the parameters to the optimal values such that the signal quality becomes the maximum.

In the embodiment, the write system parameter includes a write current Iw flowing through the head and the amount of overshoot (O/S) in a rising portion of the write current flowing through the head, and the write current Iw and the amount of O/S are adjusted.

In addition, in the embodiment, the read system parameters includes a cut-off frequency fc of the LPF 80 that extracts a head read signal and a boot value B that emphasizes a high frequency component of the head read signal, and the cut-off frequency fc and the boot value B are adjusted.

Next, parameter adjustment process performed by the adjustment region selector 52 and the parameter adjustment module 54 provided in the MPU 30 according to the embodiment is described in detail.

Figure 3:
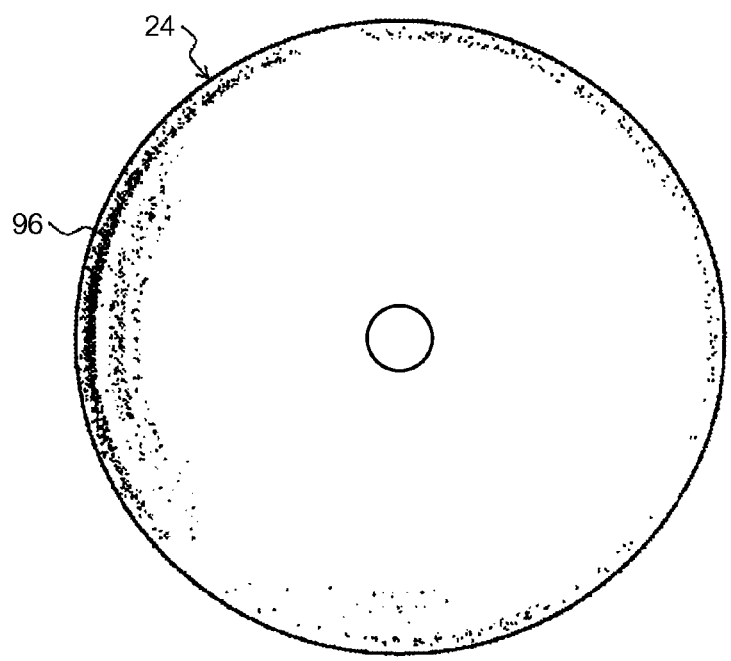
FIG. 3 is an exemplary diagram illustrating distribution of read errors depending on the in-plane coercivity of a magnetic disk in the one embodiment.

FIG. 3 is a diagram illustrating the distribution of read errors caused based on the in-plane coercivity in the magnetic disk. In FIG. 3, the in-plane coercivity Hc on the write surface of a magnetic disk 24 varies due to non-uniformity occurring in the magnetic disk 24 during a manufacturing process.

The distribution of the in-plane coercivity Hc in the magnetic disk 24 can be determined by considering the degree of occurrence of the read errors caused when read process is performed on the magnetic disk 24. The read errors are distributed in the circumference of the magnetic disk 24 as illustrated in FIG. 3. In particular, a read error concentrated part 96 on which most of the read errors belong is provided on the leftmost side of the magnetic disk 24.

It can be determined that a portion of the magnetic disk 24 on which the read errors are huddled has high in-plane coercivity Hc. That is, the recording element of the head cannot not sufficiently write data to a portion of the magnetic disk 24 having high in-plane coercivity Hc, and as a result, causing the read errors. In other words, the distribution of the read errors indicates the distribution of portions having high in-plane coercivity Hc in the magnetic disk.

In the embodiment, the magnitude of the in-plane coercivity in the plane of the magnetic disk is determined on the basis of a variation in the in-plane coercivity estimated by the read error distribution illustrated in FIG. 3.

Figure 4:
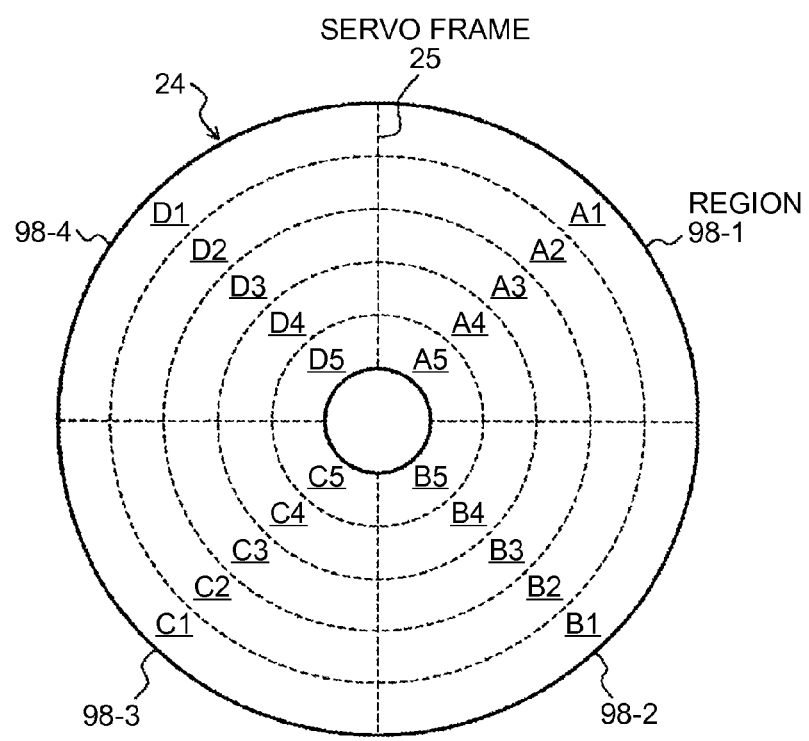
FIG. 4 is an exemplary diagram illustrating a medium surface of the magnetic disk divided into four regions in a circumferential direction in the one embodiment.

FIG. 4 is a diagram illustrating an example in which the medium surface of the magnetic disk of the embodiment is divided into four regions in the circumferential direction. The magnitude of the in-plane coercivity is determined for each of the four regions in the circumferential direction.

In FIG. 4, the magnetic disk 24 is divided into four regions 98-1, 98-2, 98-3, and 98-4 in a clockwise direction from, for example, a servo frame 25 having an index written thereon in the circumferential direction.

In addition, the magnetic disk 24 according to the embodiment is divided into, for example, five zones in the radius direction. Therefore, the magnetic disk 24 is divided into twenty (=4×5) regions by combinations of the four regions 98-1 to 98-4 in the circumferential direction and the five zones in the radius direction.

When representing the regions 98-1 to 98-4 in the circumferential direction by A, B, C, and D and representing the five zones in the radius direction by Z1 to Z5 from the outer side, as illustrated in FIG. 4, the region 98-1 is divided into sub-regions A1 to A5, the region 98-2 is divided into sub-regions B1 to B5, the region 98-3 is divided into sub-regions C1 to C5, and the region 98-4 is divided into sub-regions D1 to D5.

In the embodiment, the magnitudes of the in-plane coercivity in the four regions in each zone in the circumferential direction are determined, and the parameter adjustment region used for parameter adjustment is selected.

Figure 5:
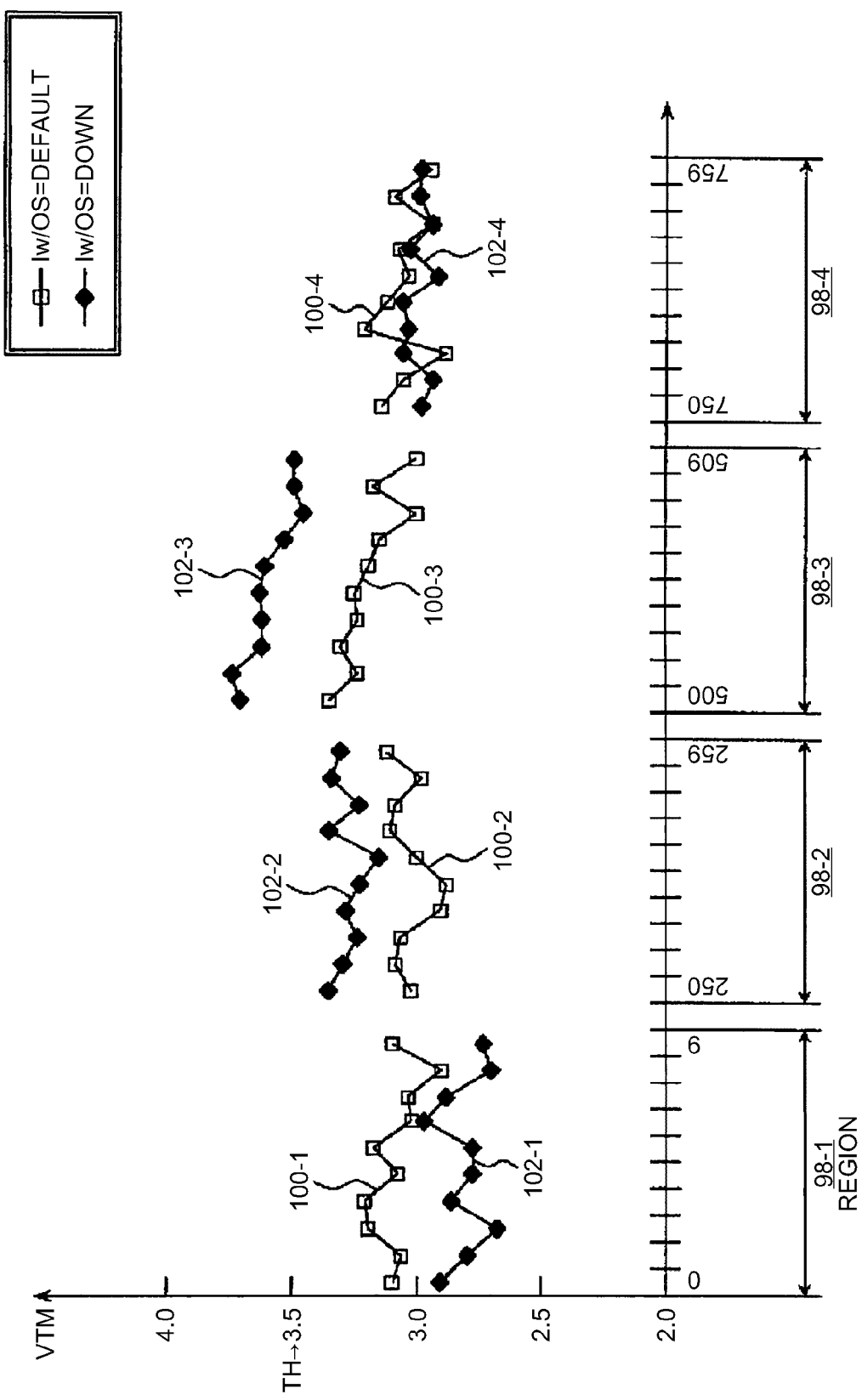
FIG. 5 is an exemplary diagram illustrating VTMs measured by writing data to and reading data from a plurality of sectors in each of the divided regions illustrated in FIG. 4 using a default write parameter and a reduced write parameter in the one embodiment.

FIG. 5 is a diagram illustrating the distribution of the VTMs measured to select the parameter adjustment region and measured for a plurality of sectors in each of the divided regions in the circumferential direction of FIG. 4.

FIG. 5 illustrates the measurement results of the VTMs in ten sectors counted from the start portion of each of the regions 98-1 to 98-4 when a default parameter is used for a specific track in the outermost zone of each of the regions 98-1 to 98-4 illustrated in FIG. 4.

When the number of sectors in one track is 1000 in FIG. 5, the sector numbers of the four divided regions 98-1 to 98-4 are 0 to 249, 250 to 499, 500 to 749, and 750 to 999, respectively.

FIG. 5 illustrates the measurement results 100-1, 100-2, 100-3, and 100-4 of the VTMs for ten sectors counted from the head of each region, that is, sector numbers 0 to 9 in the region 98-1, sector numbers 250 to 259 in the region 98-2, sector numbers 500 to 509 in the region 98-3, and sector numbers 750 to 759 in the region 98-4.

As can be seen from FIG. 5, when the VTMs 100-1 to 100-4 measured for the ten sectors in each of the regions 98-1 to 98-4 using the default parameter are compared with each other, the difference among the VTMs 100-1 to 100-4 appears to be not large since the VTMs are distributed on about 3.0. Therefore, it is difficult to sufficiently determine the difference among the in-plane coercivity from the measurement results.

Therefore, in the embodiment, the VTMs measured from the regions 98-1 to 98-4 are compared with each other, and when the difference thereamong are less than a predetermined threshold value, the default parameters are changed in a direction in which the signal quality deteriorates. Then, the VTMs are measured from each of the regions, and the measured VTMs are compared with each other.

Regarding the comparison among the VTMs 100-1 to 100-4 measured using the default parameters illustrated in FIG. 5, the VTMs of ten sectors in each of the regions 98-1 to 98-4 are measured, the average values of the VTMs in each of the regions 98-1 to 98-4 are calculated, and the average values are compared.

In the embodiment, there is no difference among the VTMs measured using the default parameters. In this case, for example, when the write current Iw and the overshoot O/S, which are the write system parameters, are reduced to be less than the default value and the VTMs are measured for the regions 98-1 to 98-4, VTM distributions 102-1, 102-2, 102-3, and 102-4 are obtained.

As such, in the VTM distributions 102-1 to 102-4 that are measured using reduced default parameters, the value of the VTM is increased and deteriorated, and the difference among the VTMs measured for the regions 98-1 to 98-4 is increased. Therefore, a difference in write performance on the medium surface of the magnetic disk due to the in-plane coercivity Hc becomes apparent.

As can be seen from FIG. 5, among the VIM distributions 102-1 to 102-4 obtained by using the write current and the overshoot value less than the default values, the region 98-3 is the worst, so that the VTM is the worst in the region 98-3.

Therefore, in the region 98-3 in which the VTM distribution 102-3 is the worst, the in-plane coercivity Hc of the magnetic disk is high, and it is difficult to write data to the region 98-3.

In the embodiment, the region 98-3 having the worst VTM distribution 102-3 which is expected to have the highest in-plane coercivity Hc in the magnetic disk is selected as a parameter adjustment region from the measurement results of the VTMs illustrated in FIG. 5.

As described above, in the embodiment, two write system parameters, that is, the write current Iw and the overshoot value O/S are changed to deteriorate the signal quality when the difference between the VTMs measured for the plurality of regions is less than the threshold value.

Figure 6A:
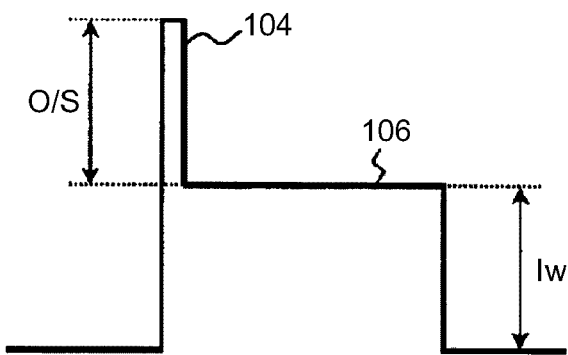
FIGS. 6A and 6B are exemplary diagrams illustrating a write current and an overshoot that are changed as write parameters in the one embodiment.
Figure 6B:
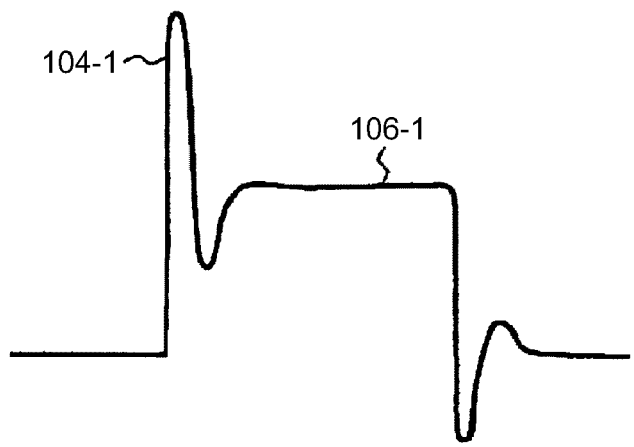

FIGS. 6A and 6B are diagrams illustrating the write current and the overshoot that are changed as the write parameters in the embodiment. FIG. 6A illustrates the waveform of a write pulse input to the driver 72 illustrated in FIG. 2. The write current Iw is determined by the height of a write pulse 106, and an overshoot pulse 104 is added to a rising portion of the write pulse 106. The overshoot pulse 104 determines the overshoot value O/S.

When the write pulse 106 having the overshoot pulse 104 illustrated in FIG. 6A added thereto is applied to the recording element of the head by the driver 74 of the head IC 28, a write current waveform illustrated in FIG. 6B is obtained. An overshoot current 104-1 at the rising edge of the write current waveform generates a write magnetic field applied to the magnetic disk.

Since the in-plane coercivity of the magnetic disk prevents the overshoot current 104-1 from being written, it is necessary to increase the overshoot current 104-1 in a portion having high in-plane coercivity.

On the other hand, as illustrated in FIG. 5, in order to increase the difference between the VTMs measured for each region, the overshoot current 104-1 is reduced to deteriorate the write performance in the portion having high in-plane coercivity. In this way, the VTMs can be reduced.

Two read system parameters, that is, the cut-off frequency fc and the boot value B are adjusted to reduce the VTMs in the embodiment.

Figure 7:
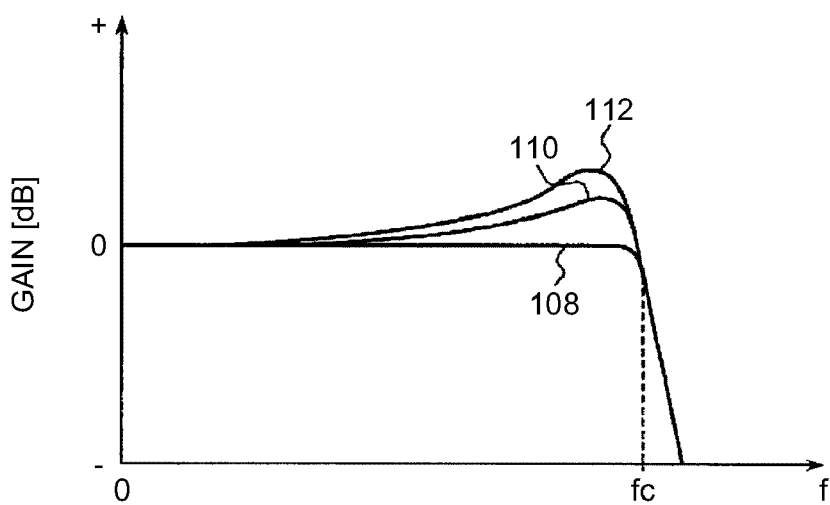
FIG. 7 is an exemplary graph illustrating a cut-off frequency and a boot value that are changed as read parameters in the one embodiment.

FIG. 7 is a diagram illustrating the cut-off frequency and the boot value that are changed as the read parameters in the embodiment. FIG. 7 illustrates frequency characteristics determined by the LPF 80 and the FIR filter 84 of the read demodulator 58 illustrated in FIG. 2. In FIG. 7, frequency characteristics 110 and 112 are obtained by emphasizing a high frequency component of a flat frequency characteristic 108, which is a gain of 0 dB for the cut-off frequency fc determined by the highest recording frequency for the magnetic disk, and the increment of the high frequency component in the frequency characteristics 110 and 112 is set as the boot value B.

The boot values in the frequency characteristics 110 and 112 can be adjusted by changing the tap coefficient of the FIR filter 84 illustrated in FIG. 2.

Figure 8:
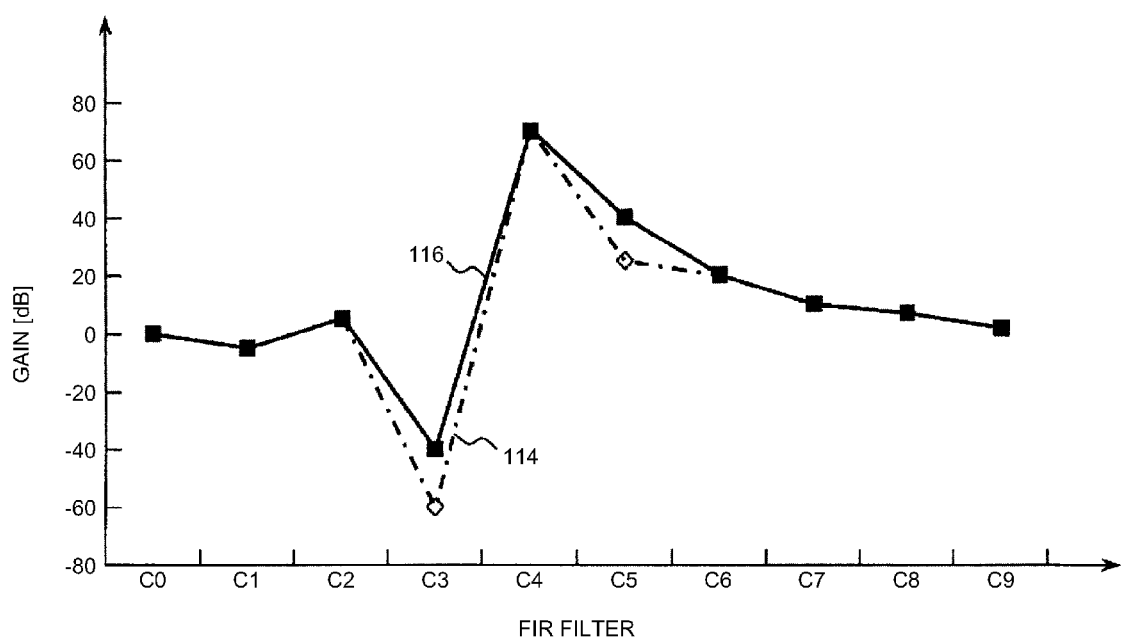
FIG. 8 is an exemplary graph illustrating the tap coefficient of an FIR filter for changing the boot value in the one embodiment.

FIG. 8 is a diagram illustrating the tap coefficient of the FIR filter for changing the boot value in the embodiment. In FIG. 8, the horizontal axis indicates the tap values C0 to C9 of the FIR filter and the vertical axis indicates the gain at each tap value.

A tap characteristic 114 is a default tap value. In this case, for example, the boot value in the frequency characteristic 112 illustrated in FIG. 7 is obtained. In the embodiment, when there is no difference between the VTMs that are measured for the four divided regions using the default parameter, the parameters are changed in the direction in which the signal quality deteriorates, and the tap value of the FIR filter is changed in the direction in which the boot value is reduced.

In FIG. 8, it is possible to reduce the boot value as in the frequency characteristic 110 illustrated in FIG. 7 by reducing the tap values C3 and C5 of the FIR filter.

Meanwhile, for the cut-off frequency fc illustrated in FIG. 7, the cut-off frequency of the LFP 80 illustrated in FIG. 2 is changed.

Figure 9:
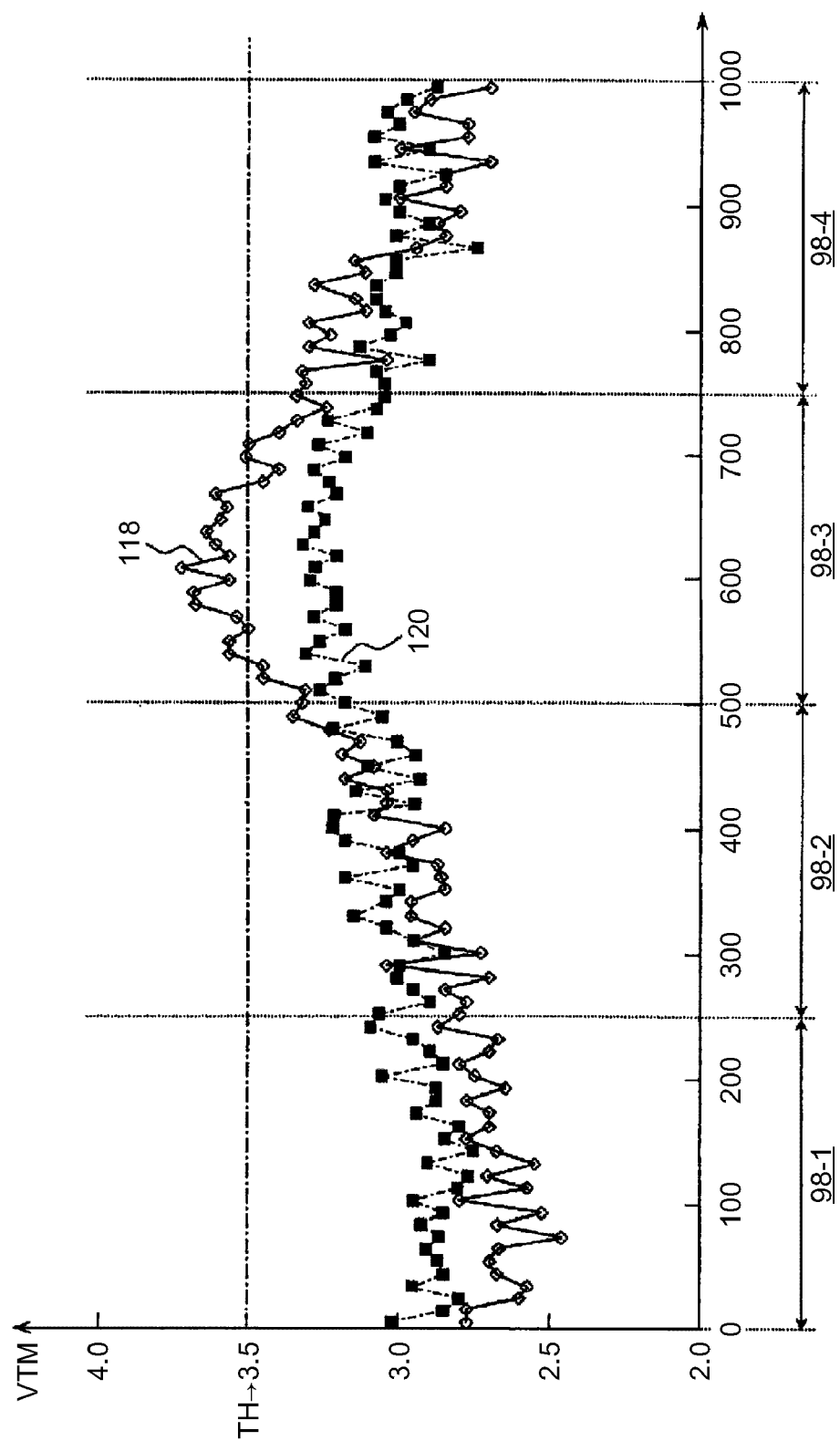
FIG. 9 is an exemplary graph illustrating distribution of VTMs corresponding to one track when the parameters are optimized by selecting the worst VTM region in FIG. 5 and distribution of VTMs obtained through conventional optimization in the one embodiment.

FIG. 9 is a graph illustrating the distribution of VTMs obtained by the conventional optimization and the distribution of VTMs corresponding to one track when the write system parameters are changed to select the region 98-3 as the worst VTM region in FIG. 5, thereby optimizing the parameters.

In FIG. 9, a VTM distribution 118 is a conventional one and a VTM distribution 120 is of the embodiment. The conventional VTM distribution 118 is obtained by adjusting the parameters in a predetermined sector range of the magnetic disk to calculate the optimal value, without considering the distribution of the in-plane coercivity in the magnetic disk, and measuring VTMs corresponding to one track using the calculated optimal values.

In contrast, the VTM distribution 120 of the embodiment is obtained by using the ten sectors within the region 98-3 having the highest in-plane coercivity Hc in which the VTMs illustrated in FIG. 5 is the worst. In particular, the write system parameters and the read system parameters are adjusted by using the VTMs in the ten sectors so as to minimize the VTMs or maximize the signal quality to calculate the optimal values. Then, the VTMs of one track are measured using the calculated optimal values to obtain the VTM distribution 120.

As can be seen by comparing the conventional VTM distribution 118 and the VTM distribution 120 of the embodiment, for example, when the threshold value TH of an unrecovered error is 3.5 in the VTM, the VTM is more than the threshold value TH in the region 98-3 having the highest in-plane coercivity Hc in the VTM distribution 118. Therefore, an unrecovered error occurs in the magnetic disk device.

In contrast, in the VTM distribution 120 of the embodiment, the optimal values are obtained by the parameter adjustment operation using the region 98-3 having the highest in-plane coercivity Hc, and the VTM distribution 120 is obtained by VTM measurement using the adjusted optimal values. Therefore, in the VTM distribution 120, the VTM is not more than the threshold value TH (=3.5) and no unrecovered error occurs in the magnetic disk device.

That is, as in the embodiment, when a region having high in-plane coercivity Hc is used to obtain the optimal parameters, it is possible to obtain the adjustment result with little error.

Figure 10A:
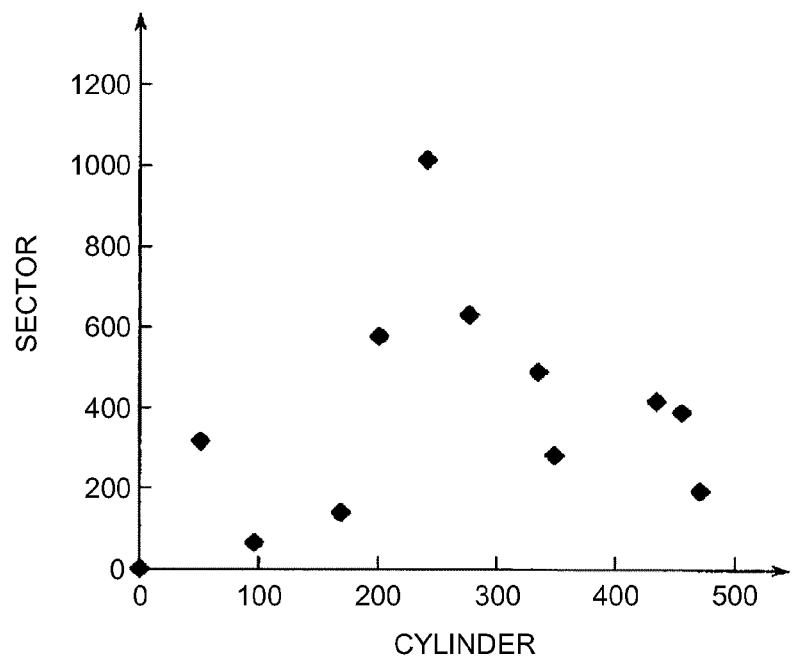
FIG. 10A is an exemplary graph illustrating read error distribution of when the optimal parameter values obtained by selecting the worst VTM region are used in the one embodiment.
Figure 10B:
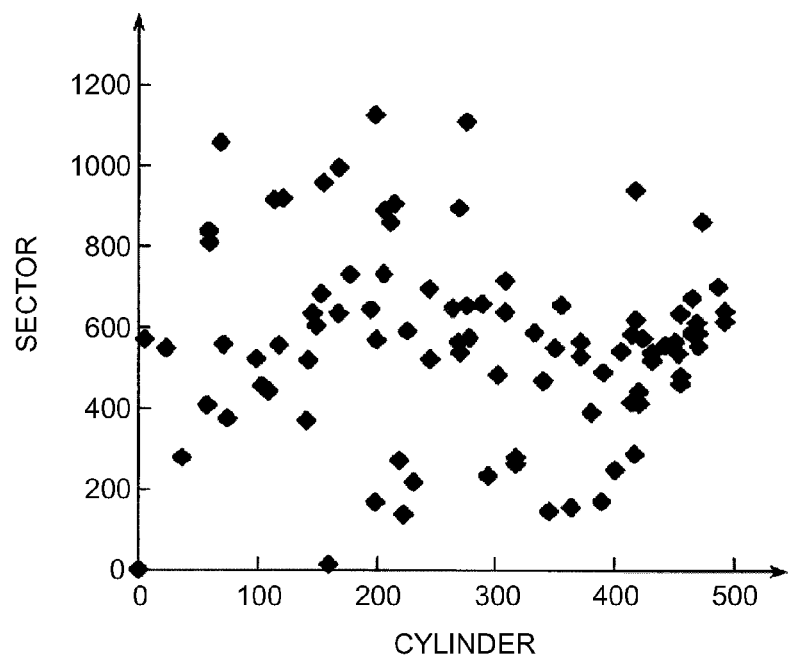
FIG. 10B is an exemplary graph illustrating read error distribution of when the conventional optimal parameter values are used.

FIG. 10A is a diagram illustrating read error distribution of the embodiment, obtained by using the optimal parameter values obtained by selecting the worst VTM region and by adjusting the parameter values based on that of the selected worst VTM region, and FIG. 10B is a diagram illustrating read error distribution obtained using the conventional optimal parameter values.

FIG. 10A illustrates read error distribution in the entire magnetic disk when the optimal parameter values of the embodiment is used. In FIGS. 10A and 10B, the horizontal axis indicates the number of cylinders and the vertical axis indicates the number of sectors per track. The magnetic disk has cylinder numbers 0 to 500 and sector numbers 0 to 1200. The number of read errors in the entire storage medium surface of the magnetic disk is 12, and the read errors are spread to the entire surface.

FIG. 10B illustrates a read error distribution obtained using the conventional optimal parameter values. The read errors are concentrated on sector number 600 in the radius direction represented by cylinder numbers 0 to 500. In addition, the read errors are partially concentrated on the upper and lower sides of the sector number 600. In FIG. 10B, the read errors are distributed in a range wider than that illustrated in FIG. 10A.

Therefore, as can be seen from the read error distribution illustrated in FIG. 10A of the embodiment, when the worst VTM region is selected and the parameters are adjusted to the optimal values, the read errors are significantly reduced.

Figure 12:
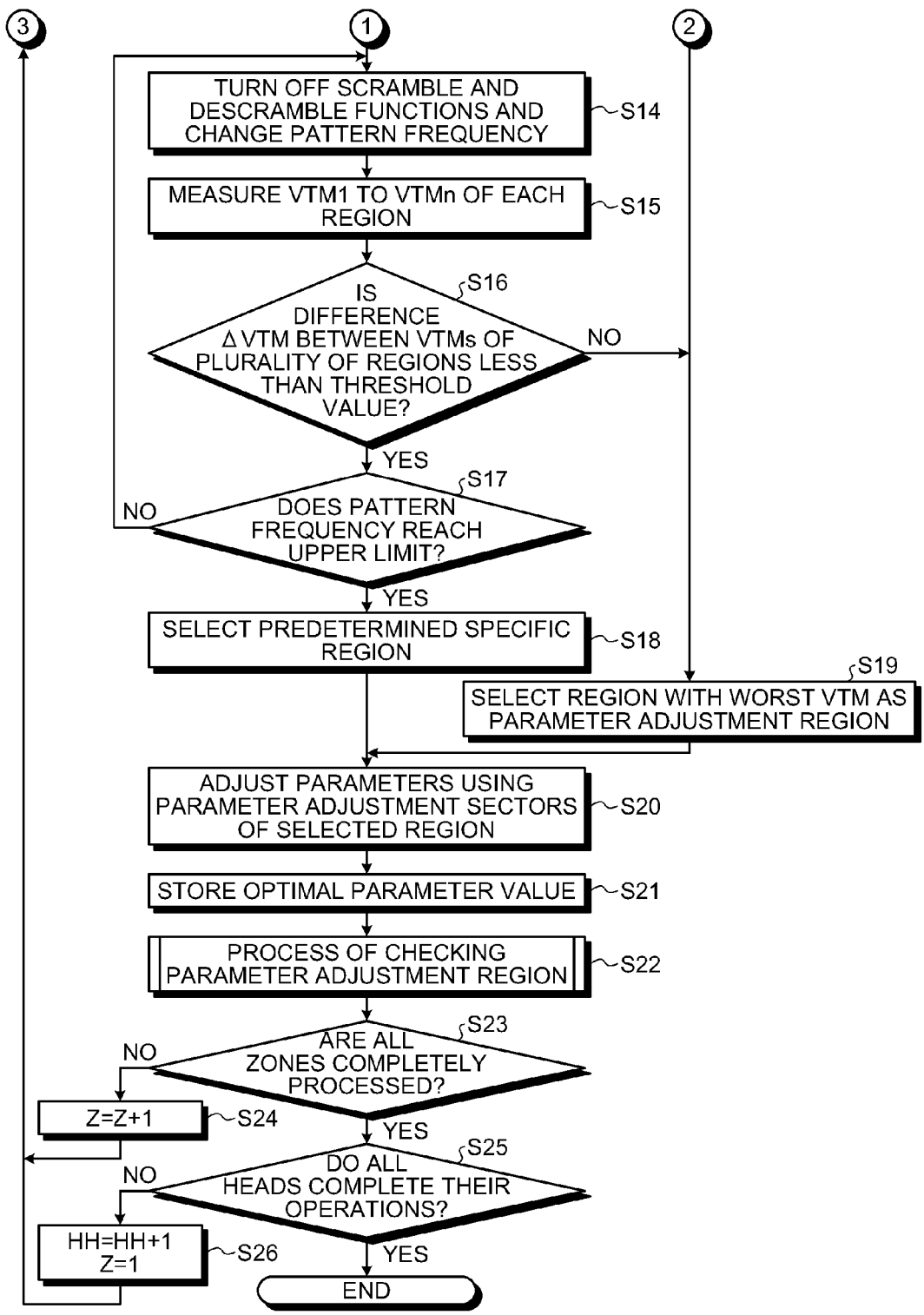
FIG. 12 is an exemplary flowchart illustrating parameter adjustment process subsequent to the parameter adjustment process of FIG. 11 in the one embodiment.

FIGS. 11 and 12 are flowcharts illustrating a parameter adjustment process according to this embodiment. The parameter adjustment process will be described below with reference to FIG. 1.

In FIG. 11, in the parameter adjustment process of the embodiment, first, in S1, a head number HH and a zone number Z are initialized to 1. When the head number HH is 1, for example, the head 26-1 illustrated in FIG. 1 is selected. When the zone number Z is 1, a zone including the outermost sub-regions A1, B1, C1, and D1 illustrated in FIG. 4 of the write medium surface of the magnetic disk 24-1 corresponding to the head 26-1 is selected.

In S2, the write system parameters and the read system parameters are set to their upper limits. The write system parameters comprise the write current Iw and the overshoot value O/S, and the read system parameters comprise the cut-off frequency fc and the boot value B.

Then, in S3, measurement sectors are set in n regions, for example, four regions divided in the circumferential direction. For example, as illustrated in FIG. 5, ten sectors from the head of each of the regions are set as the measurement sectors. Then, in S4, predetermined test data is written to and read from the measurement sectors of each region using the write system parameters and the read system parameters set in Step S2, and VTM1 to VTMn obtained from the read channel 48 are measured.

Then, in S5, the average values of the VTMs distributed in each region is calculated, and it is checked whether the difference between the average values is less than a predetermined threshold value. For example, when the average values measured in the four regions are VTM1 to VTM4, the following is calculated:

$$\Delta VTM12=VTM1-VTM2$$

$$\Delta VTM13=VTM1-VTM3$$

$$\Delta VTM14=VTM1-VTM4$$

$$\Delta VTM23=VTM2-VTM3$$

$$\Delta VTM24=VTM2-VTM4$$

$$\Delta VTM34=VTM3-VTM4.$$

When all the differences are less than the threshold value, the process proceeds to S6. When all the differences are not less than the threshold value, the process proceeds to S19 illustrated in FIG. 12.

In S5, when all the differences among the VTMs of the regions are less than the threshold value, the parameters are changed in the direction in which the VTMs become worse in order to make the difference among the VTMs of each of the regions more than the threshold value.

Process of changing the write system parameters in S6 to S9; process of changing the read system parameters in S10 to S13; and process of changing the data pattern in S14 to S17, are used to change the parameters in the direction in which the signal quality deteriorates.

In S6, the write current Iw and the overshoot value O/S, which are the write system parameters, are reduced from their upper limits set in S2 by a predetermined value. In S7, the changed write system parameters are used to measure VTM1 to VTMn for each region. In S8, it is checked whether all the differences among the VTMs of the regions are less than the threshold value. If it is checked that any of the differences is more than the threshold value, the process proceeds to S19 illustrated in FIG. 12.

When all the differences are less than the threshold value, it is checked in S9 whether the write system parameters reach the lower limit. If it is checked that the write system parameters do not reach the lower limit, the process proceeds to S6 and the write system parameters are changed again. Then, the above-mentioned process is repeatedly performed.

If it is checked in S9 that the write system parameters reach the lower limit, the read system parameters are changed in S10. The cut-off frequency fc and the boot value B, which are the read system parameters, are reduced from the upper limit set in S2 per a predetermined value in the direction in which the VTM becomes worse.

Then, in S11, VTM1 to VTMn are measured for each region. In S12, it is checked whether the difference among the VTMs of the regions is less than the threshold value. If it is checked that the difference is more than the threshold value, the process proceeds to S19 illustrated in FIG. 12. If it is checked in S12 that the difference is less than the threshold value, the process from S10 is repeatedly performed until the read parameters reach the lower limit in S13.

In S13, when the read system parameters reach the lower limit, the process proceeds to S14 illustrated in FIG. 12, and the data pattern of the test data used to measure the VTM is changed in the direction in which the signal quality deteriorates.

In order to change the data pattern, first, in S14, the scramble circuit 62 and the descramble circuit 92 provided in the read channel 48 illustrated in FIG. 2 perform scrambling and descrambling to change the pattern frequency of the test data.

When general user data is input to the scramble circuit 62 of the read channel 48 illustrated in FIG. 2, the XOR operation is performed on the user data and a predetermined pseudo random series to convert a write data pattern into data in the vicinity of a hexadecimal number 'F2' or a binary number '11110010'. Therefore, even when the pattern frequency of the test data is changed, the change of the pattern frequency is cancelled by scrambling. Therefore, the scramble circuit 62 is descrambled.

For example, test data with one sector length is prepared as the pattern frequency of the test data in S14, and repeated data 'FFF ... 000 ...' corresponding to the lowest write frequency is used as initial data.

The data pattern frequency of the test data is changed stepwise to a high frequency in order to deteriorate the signal quality. In this case, the upper limit frequency is, for example, repeated data 'F0F0F0 ... F0' corresponding to the highest write frequency.

Then, in S15, VTM1 to VTM4 are measured from each region using the test data whose pattern frequency is changed. In S16, it is checked whether the difference among the VTMs of the regions is less than the threshold value. If it is checked that the difference is more than the threshold value, the process proceeds to S19. If it is checked that the difference is less than the threshold value, the process proceeds to S17. Then, the process from S14 is repeatedly performed until the pattern frequency reaches the upper limit.

If it is determined in S17 that the pattern frequency reaches the upper limit, the difference among the VTMs of the regions is less than the threshold value even though the parameters and the pattern frequency are changed. That is, the distribution of the in-plane coercivity in the magnetic disk is substantially uniform. Therefore, the process proceeds to S18. In this case, a predetermined specific region is fixedly selected as the parameter adjustment region.

If the difference among the VTMs of the regions is more than the threshold value in any one of S5, S8, and S12 of FIGS. 11 and S16 of FIG. 12, there is a large difference among the in-plane coercivity Hc of the plurality of regions. Therefore, in S19, the worst VTM region among the regions is selected as the parameter adjustment region.

Then, the process proceeds to S20, and the parameter adjustment process is performed on the selected parameter adjustment region using a predetermined number of parameter adjustment sectors, for example, ten sectors from the head of each region, as illustrated in FIG. 5.

That is, while the test data is written to the adjustment sectors of the parameter adjustment region and is then read therefrom, the write current Iw and the overshoot value O/S, which are the write system parameters, and the cut-off frequency fc and the boot value B, which are the read system parameters, are adjusted such that the VTM becomes the minimum or the signal quality becomes the maximum.

Then, in S21, the adjusted parameters are stored as the optimal parameter values in the adjusted parameter storage module 36 of the non-volatile memory 35 illustrated in FIG. 1.

Then, in S22, a process of checking the parameter adjustment region, which will be described in detail, is performed.

Then, in S23, it is checked whether all the zones are completely processed. If it is determined that all the zones are not processed, in S24, the zone number Z is increased by 1 and the process returns to S2 illustrated in FIG. 11 to repeatedly perform the same process as described above on the next zone.

If it is determined in S23 that all the zones are completely processed, in S25, it is checked that the processes of all the heads end. If it is checked that the processes of all the heads does not end, in S26, the head number HH is increased by 1 and the zone number Z is initialized to 1. Then, the process proceeds to S2 illustrated in FIG. 11 to repeatedly perform the same process as described above on the medium surface of a magnetic disk corresponding to the next head.

Figure 13:
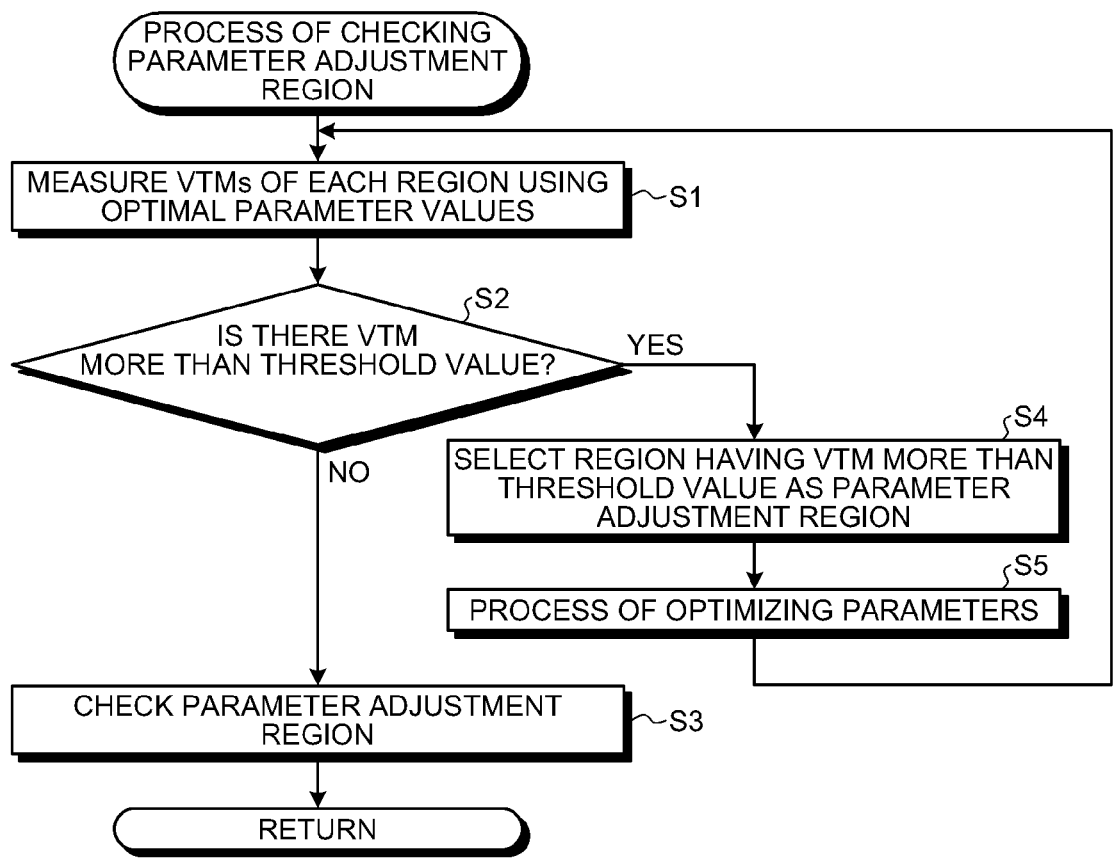
FIG. 13 is an exemplary flowchart illustrating details of process of checking a parameter adjustment region in S22 of FIG. 12 in the one embodiment.

Next, the process of checking the parameter adjustment region in S22 of FIG. 12 is described. FIG. 13 is a flowchart illustrating details of the process of checking the parameter adjustment region according to the embodiment. An adjustment region check module 55 provided in the MPU 30 illustrated in FIG. 1 performs the process of checking the parameter adjustment region. In the embodiment, the process of checking the parameter adjustment region is optional, and it may not be necessarily performed.

In FIG. 13, in the process of checking the parameter adjustment region, in S1, the adjusted optimal parameter values stored in S21 of FIG. 12 are used to measure the VTMs of each region.

The measurement of the VTMs of each of the regions using the adjusted parameters corresponds to the measurement of the average value of the VTM values measured from ten sectors from the boundary between the regions 98-1 to 98-4 in the VTM distribution 120 that is measured using the adjusted parameters illustrated in FIG. 9.

Then, in S2, it is checked whether the VTM values measured from each region are more than, for example, the threshold value TH (=3.5) illustrated in FIG. 9, which represents the unrecovered error. If it is checked that there is no VTM more than the threshold value TH, the process proceeds to S3. In this case, it is checked that the parameter adjustment region is appropriate, and for example, sector numbers 500 to 509 indicating the parameter adjustment sectors of the region 98-3 in the parameter adjustment region are stored.

On the other hand, if it is checked in S2 that there is a VTM more than the threshold value TH, it is determined that the selected parameter adjustment region is not appropriate. Therefore, the process proceeds to S4 to select the region having the VTM more than the threshold value TH as a new parameter adjustment region. In S5, the optimal parameter value of the newly selected parameter adjustment region is measured. Then, the process from S1 is repeatedly performed using the measured optimal parameter value.

In the process of checking the parameter adjustment region, the adjusted optimal parameter value is used to measure and evaluate the VTMs of all the tracks, and it is checked whether the parameter adjustment region is appropriate on the basis of the evaluation result. If it is checked that the parameter adjustment region is not appropriate, another parameter adjustment region may be selected and the optimal parameter value may be calculated.

Figure 14:
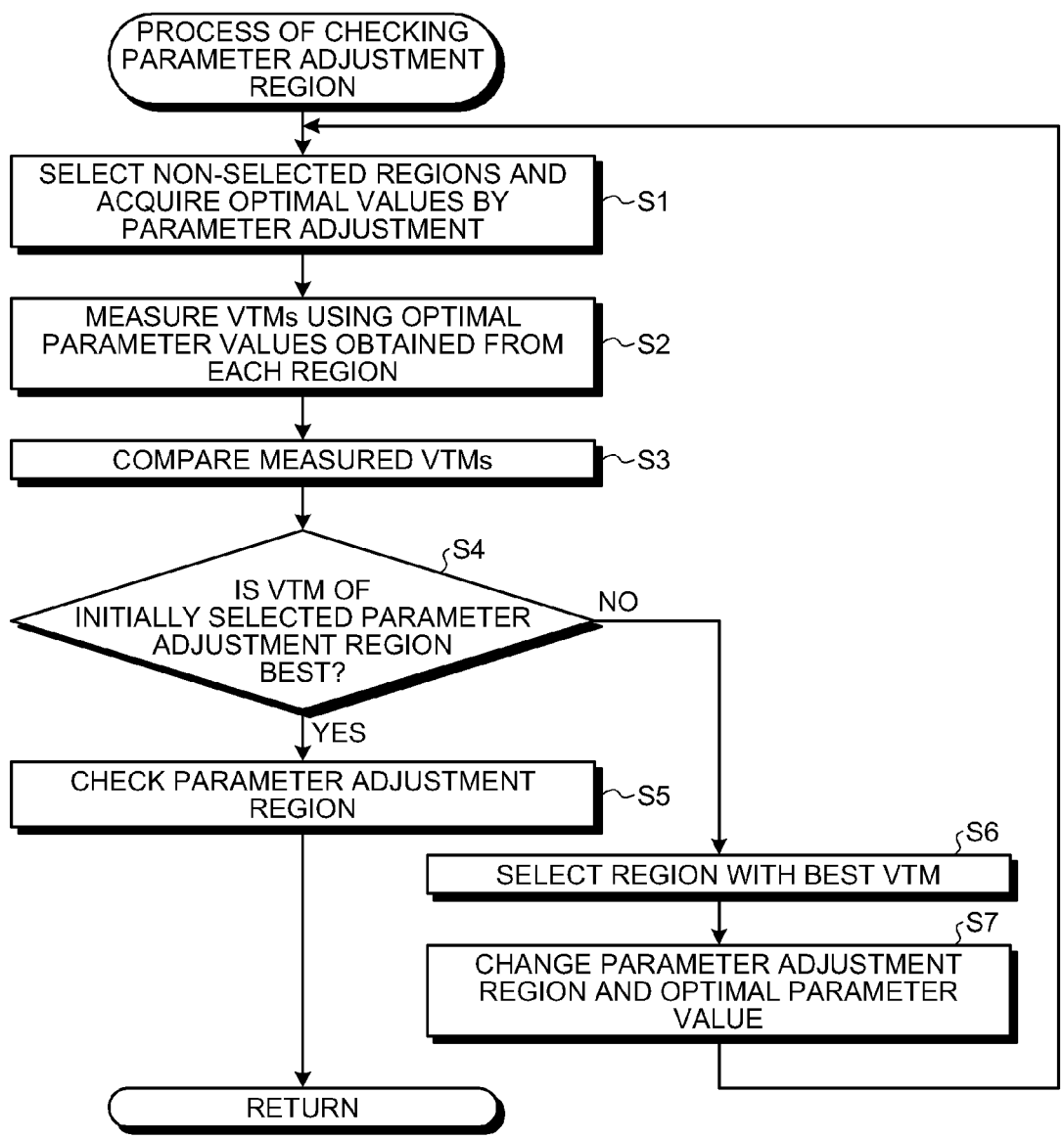
FIG. 14 is an exemplary flowchart illustrating details of process of checking the parameter adjustment region in S22 of FIG. 12 according to another embodiment of the invention.

FIG. 14 is a flowchart illustrating the process of checking the parameter adjustment region in S22 of FIG. 12, according to another embodiment.

FIG. 14, in the process of checking the parameter adjustment region according to another embodiment, in S1, the remaining regions that have not been selected are selected and parameter adjustment is performed to acquire the optimal values.

Figure 15A:
FIGS. 15A and 15B are exemplary diagrams illustrating work tables generated by the process of checking the parameter adjustment region illustrated in FIG. 14 in the another embodiment.

As a result, as illustrated in a work table 122 of FIG. 15A, the optimal values of the write parameters and the read parameters of the non-selected adjustment regions 98-1, 98-2, and 98-4 other than the selected adjustment region 98-3 are acquired.

Then, in S2, as illustrated in the work table 122 of FIG. 15A, the optimal parameter values calculated from the regions 98-1 to 98-4 are used to measure VTMs for each of the regions.

Figure 15B:

As illustrated in a work table 124 of FIG. 15B, as the measurement results in S2, for example, the measurement results of the adjustment regions 98-1 to 98-4 on the basis of the optimal parameter values illustrated in FIG. 15A, which are obtained from the regions 98-1 and 98-2, are obtained as VTMaa to VTMdd.

Then, in S4, it is determined whether the measured values VTMca to VTMcd obtained using the optimal parameter values of the initially selected parameter adjustment region, that is, the adjustment region 98-3 are the best over the VTMs measured for the other regions 98-1, 98-2, and 98-4. In other words, it is determined whether the measured values VTMca to VTMcd are the minimum among the VTMs of other regions. If it is determined that the measured values VTMca to VTMcd are optimal, the process proceeds to S5 and it is checked that the initially set parameter adjustment region 98-3 is appropriate.

On the other hand, it is determined in S4 that the VTM of the initially selected parameter adjustment region 98-3 is not optimal, the process proceeds to S6, and any one of the remaining regions 98-1, 98-2, and 98-4 having the optimal VTM is selected. In S7, the newly selected parameter adjustment region and the optimal parameter value measured from the region in S2 are changed.

The process of checking the parameter adjustment region illustrated in FIG. 14 is effective when the VTM distribution of one track measured by changing the parameters in the direction in which the signal quality deteriorates is as illustrated in FIG. 16.

In a VTM distribution 126 of one track illustrated in FIG. 16, the VTM, which is an unrecovered error, more than the threshold value TH (=3.5) exists in the region 98-2. However, in the process of selecting the parameter adjustment region according to the embodiment, the average value of the VTMs of ten sectors from the head of each of the regions 98-1 to 98-4 is calculated and compared with the threshold value TH. The average value of the VTMs of ten sectors 128 for the head of the region 98-2 and the average value of the VTMs of ten sectors 130 from the head of the region 98-3 are calculated. As a result, the region 98-3 is selected as a region with the largest VTM in which the signal quality deteriorates.

Then, the test data is written to and read from ten sectors from the head of the selected region 98-3 to acquire the optimal parameter values.

However, in selecting the parameter region, the VTM distribution 126 of one track as illustrated in FIG. 16 is not taken into account. Therefore, an adjacent region 98-3, not the region 98-2 with the highest in-plane coercivity Hc, is selected as the parameter selection region.

As a result, even when the region 98-3 with low in-plane coercivity Hc is selected to adjust the parameters to the optimal values, an unrecovered error is likely to occur in the region 98-2 when the optimal parameter values obtained from the region 98-3 is used.

In this case, according to the process of checking the parameter adjustment region illustrated in FIG. 14, the optimal values are acquired from the non-selected regions 98-1, 98-2, and 98-4 by parameter adjustment, and the optimal parameter values calculated from the regions 98-1 to 98-4 are used to measure the VTMs. As a result, the VTM measured using the optimal parameter values obtained by selecting the region 98-2 and adjusting the parameters is less than the VTM measured using the optimal parameter values calculated from the initially selected region 98-3, and it is determined that the VTM of the region 98-2 is the best.

As a result, it is possible to change the optimal parameter value obtained by adjusting the region 98-2 with the highest in-plane coercivity Hc obtained in the process of checking the parameter adjustment region as the parameter adjustment region, not the optimal parameter value obtained from the initially selected region 98-3.

In the process of checking the parameter adjustment region, even though the adjustment result is not the region with the highest in-plane coercivity Hc in the magnetic disk, it is possible to select the region with the highest in-plane coercivity Hc as the adjustment region using the check process and use the optimal parameter value obtained from the selected adjustment region.

The aforementioned embodiments also provides a program that can be executed by the MPU 30 (or a CPU or an MCU) of the magnetic disk device, that is, firmware for parameter adjustment. The program, which is the firmware for parameter adjustment, comprises the content of the flowcharts illustrated in FIGS. 11, 12, 13, and 14.

In the above-described embodiments, among the regions obtained by dividing the magnetic disk in the radius direction, a region with the worst VTM, that is, a region with the highest in-plane coercivity Hc is selected as the parameter adjustment region. However, a region with the best VTM, that is, a region with the lowest in-plane coercivity Hc may be selected as the parameter adjustment region.

In the above-described embodiments, the magnetic disk is divided into four regions in the circumferential direction and a process of selecting the parameter adjustment region from the four regions is performed. However, the magnetic disk may be divided into four or more regions in the circumferential direction.

In the above-described embodiment, for example, ten sectors from the head of each of the regions that are divided from the magnetic disk in the circumferential direction are set as the parameter adjustment sectors. However, the parameter adjustment sectors may be arranged so as to be uniformly dispersed in the sector range comprised in one region. Alternatively, when the process performance is high, all the sectors of each region may be used as the parameter adjustment sectors.

In the above-described embodiments, when the difference among the VTMs measured for each of the regions divided from the magnetic disk in the radius direction is less than the threshold value, the write parameter, the read parameter, and the data pattern are changed in this order in the direction in which the signal quality deteriorates, thereby making the difference more than the threshold value. However, the embodiments are not limited to combinations of three parameters. For example, one or two parameters may be changed.

According to one of the aforementioned embodiments, regarding the variation in the in-plane coercivity in the disk medium, it is possible to determine the adjustment values of the optimal parameters by considering the influence of coercivity. Further, it is possible to significantly reduce the possibility that an unrecovered error occurs due to a medium defect caused by insufficient write capability at a position where the in-plane coercivity is high. Still further, it is possible to optimize the read and write parameters in a manufacturing process. Still further, it is possible to improve a write margin and a read margin. Still further, it is possible to improve the performance of a device after the device is forwarded to the user. Still further, it is possible to improve quality and reliability.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device comprising:
    a head actuator configured to move a head to a position on a disk medium;
    a reader and writer configured to write data to the disk medium and read data from the disk medium using the head;
    an adjustment region selector configured to divide the disk medium into a plurality of regions in a circumferential direction, to write test data to the regions, to read the test data to measure values related to signal quality of the regions, to compare the values related to the signal quality across the regions, and to select a parameter adjustment region; and
    a parameter adjustment module configured to adjust a parameter used by the reader and writer corresponding to the selected parameter adjustment region.

2. The storage device of claim 1, wherein the adjustment region selector is configured to divide the disk medium into a plurality of zones in a radius direction and to select the parameter adjustment region for the zones.

3. The storage device of claim 1, wherein the adjustment region selector is configured to measure one of a Viterbi matrix margin and an error rate of the reader and writer as the values related to the signal quality.

4. The storage device of claim 1, wherein the adjustment region selector is configured to compare the values related to the signal quality across the regions and to select a region where the signal quality is substantially the worst as the parameter adjustment region.

5. The storage device of claim 1, wherein the adjustment region selector is configured to measure the values related to the signal quality of a plurality of predetermined sectors in each region, to calculate the average values of the measured values related to the signal quality, and to compare the average values.

6. The storage device of claim 1, wherein the adjustment region selector is configured to change a write system parameter used by the reader and writer and to measure the values related to the signal quality when a difference between the values related to the signal quality of the regions is smaller than a predetermined threshold value.

7. The storage device of claim 6, wherein the adjustment region selector is configured to change a write current flowing through the head and an amount of overshoot in a rising portion of the write current as the write system parameter in order to reduce a write performance and configured to measure the values related to the signal quality.

8. The storage device of claim 1, wherein the adjustment region selector is configured to change a read system parameter used by the reader and writer and to measure the values related to the signal quality when a difference between the values related to the signal quality of the regions is smaller than a predetermined threshold value.

9. The storage device of claim 8, wherein the adjustment region selector is configured to change a cut-off frequency of a filter configured to extract a head read signal and a boot value configured to emphasize a high frequency component of the head read signal as the read system parameters in order to reduce a read performance and configured to measure the values related to the signal quality.

10. The storage device of claim 1, wherein the adjustment region selector is configured to change the data pattern of the test data in order to reduce a write performance and a read performance and configured to measure the values related to the signal quality when a difference between the values related to the signal quality of the regions is smaller than a predetermined threshold value.

11. The storage device of claim 10, wherein the adjustment region selector is configured to measure the values related to the signal quality while changing the pattern frequency of the test data stepwise from a low frequency to a high frequency, without scrambling in a write system of the reader and writer and descrambling in a read system of the reader and writer.

12. The storage device of claim 1, further comprising an adjustment region check module configured to check whether the parameter adjustment region is appropriate when the values related to the signal quality of the regions measured by the reader and writer using the adjusted parameter value by the parameter adjustment module is equal to or larger than a predetermined threshold value.

13. The storage device of claim 1, further comprising an adjustment region check module configured to select a second region other than the parameter adjustment region, to adjust the parameter by the parameter adjustment module, to measure values related to the signal quality of the regions, and to compare the values related to the signal quality of the regions by the reader and writer using the adjusted parameter value from the parameter adjustment region and the second region in order to check whether the parameter adjustment region is appropriate.

14. The storage device of claim 12,
wherein the adjustment region check module is configured to check whether the parameter adjustment region is appropriate when the measured value related to the signal quality using the adjusted parameter value of the parameter adjustment region is larger than the measured value related to the signal quality using the adjusted parameter value of the second region, and
the adjustment region check module is configured to change the parameter adjustment region to a region with substantially the best signal quality when the measured value related to the signal quality using the adjusted parameter value of the parameter adjustment region is smaller than the measured value related to the signal quality using the adjusted parameter value of the second region.

15. A processor of a storage device configured to:
cause a head actuator to move a head to a position on a disk medium;
cause the head to write data to the disk medium or read data from the disk medium;
divide the disk medium into a plurality of regions in a circumferential direction;
write test data to the regions;
read the test data in order to measure values related to the signal quality of the regions;
compare the values related to the signal quality of the regions in order to select a parameter adjustment region; and
adjust a parameter used to write data to the disk medium and read data from the disk medium using the selected parameter adjustment region.

16. The processor of the storage device of claim 15, wherein a Viterbi matrix margin or an error rate of writing or reading is measured as the values related to the signal quality while selecting the parameter adjustment region.

17. The processor of the storage device of claim 15, wherein the values related to the signal quality of the regions are compared, and a region with substantially the worst signal quality is selected as the parameter adjustment region.

18. A computer program product comprising a non-transitory computer readable medium that stores a program that, when executed by a computer, causes the computer to:
allow a head actuator to move a head to a position on a disk medium;
allow the head to write data to the disk medium or read data from the disk medium;
divide the disk medium into a plurality of regions in a circumferential direction;
write test data to the regions,
read the test data in order to measure values related to the signal quality of the regions;
compare the values related to the signal quality of the regions;
select a parameter adjustment region; and
adjust a parameter used to write data to the disk medium and read data from the disk medium using the selected parameter adjustment region.

19. The computer program product of claim 18, further causes the computer to divide the disk medium into a plurality of zones in a radius direction and to select the parameter adjustment region for the zones while selecting the parameter adjustment region.

20. The computer program product of claim 18, further causes the computer to measure a Viterbi matrix margin or an error rate while reading and writing as the values related to the signal quality.

* * * * *